United States Patent
Zhang et al.

(10) Patent No.: US 9,282,473 B2
(45) Date of Patent: Mar. 8, 2016

(54) WIRELESS COMMUNICATION SYSTEM WITH CHANNEL-QUALITY INDICATOR MECHANISM AND METHOD OF OPERATION THEREOF

(71) Applicant: Samsung Electronics Co., Ltd., Gyeonggi-do (KR)

(72) Inventors: Nan Zhang, San Diego, CA (US); Shahab Sanayei, San Diego, CA (US); Jungwon Lee, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 205 days.

(21) Appl. No.: 13/910,940

(22) Filed: Jun. 5, 2013

(65) Prior Publication Data

US 2013/0343272 A1    Dec. 26, 2013

Related U.S. Application Data

(60) Provisional application No. 61/657,017, filed on Jun. 7, 2012.

(51) Int. Cl.
*H04W 24/02* (2009.01)
*H04L 5/00* (2006.01)
*H04B 17/24* (2015.01)
*H04B 17/309* (2015.01)
*H04L 1/00* (2006.01)
*H04W 28/18* (2009.01)

(52) U.S. Cl.
CPC ............. *H04W 24/02* (2013.01); *H04B 17/24* (2015.01); *H04B 17/309* (2015.01); *H04L 1/00* (2013.01); *H04L 5/00* (2013.01); *H04W 28/18* (2013.01)

(58) Field of Classification Search
None
See application file for complete search history.

(56) References Cited

U.S. PATENT DOCUMENTS

| | | | |
|---|---|---|---|
| 8,018,902 | B2 | 9/2011 | Wintzell |
| 2004/0110473 | A1 | 6/2004 | Dick et al. |
| 2006/0019694 | A1* | 1/2006 | Sutivong et al. ............. 455/522 |
| 2006/0023650 | A1 | 2/2006 | Dominique et al. |
| 2006/0093024 | A1* | 5/2006 | Pietraski et al. ............. 375/220 |
| 2008/0095185 | A1 | 4/2008 | Digirolamo et al. |
| 2010/0035627 | A1 | 2/2010 | Hou et al. |
| 2011/0223957 | A1 | 9/2011 | Pietraski |
| 2011/0299447 | A1 | 12/2011 | Dick et al. |
| 2012/0082157 | A1 | 4/2012 | Yamada et al. |
| 2012/0115463 | A1* | 5/2012 | Weng et al. .................. 455/425 |
| 2013/0107782 | A1* | 5/2013 | Anas et al. .................... 370/311 |

FOREIGN PATENT DOCUMENTS

WO    2012-061325 A1    5/2012

OTHER PUBLICATIONS

K. Ko, D. Lee, M. Lee, and H.S. Lee, "A Novel SIR to Channel-Quality Indicator (CQI) Mapping Method for HSDPA System", in IEEE Vehicular Technology Conf., 2006.
J. Zhang, B. Raghothaman, Y, Wang, and G. Mandiam, "Receivers and CQI Measures for MIMO-CDMA Systems", in EURASIP Journal on Applied Signal Processing 2005:11, pp. 1668-1679.

* cited by examiner

*Primary Examiner* — Kerri Rose
(74) *Attorney, Agent, or Firm* — IP Investment Law Group (57) ABSTRACT

A wireless communication system includes: a filter configured to monitor a behavior of a channel-quality indicator response; and a base station behavior matrix, coupled to the filter, configured to select an ACK channel-quality indicator to be transmitted.

20 Claims, 6 Drawing Sheets

WIRELESS COMMUNICATION SYSTEM WITH CHANNEL-QUALITY INDICATOR MECHANISM AND METHOD OF OPERATION THEREOF

CROSS-REFERENCE TO RELATED APPLICATION(S)

This application claims the benefit of U.S. Provisional Patent Application Ser. No. 61/657,017 filed Jun. 7, 2012, and the subject matter thereof is incorporated herein by reference thereto.

TECHNICAL FIELD

An embodiment of the present invention relates generally to a wireless communication system, and more particularly to a system for optimizing throughput for wireless communication.

BACKGROUND

The next generation cellular mobile system, can support smart phones, laptop computers, tablet computers, and automobile communication systems. Since both pico-cell and femto-cell services were recently launched, the interference signal from these local cells has also become a major source to degrade the performance for the desired signal. In case of a point-to-point communication where a single transmitter sends a signal to the designated receiver, there is a protocol between a base station (eNodeB) and a user equipment (UE) so that they can share systematic parameters, such as modulation-and-coding scheme (MCS), handshake signals (ACK/NACK), and control information, that is needed for decoding the desired signal.

Wireless communication systems typically employ one or more modulation schemes to communicate voice, data, and control information between the base station and the user equipment. The communication sequences must be decoded from frequency transmissions.

In cellular mobile communications systems like HSPA/LTE, adaptive modulation and coding (AMC) can be used as a technique for increasing reliability of wireless communication. The wireless communication system may use a channel-quality indicator (CQI) to support the AMC. The CQI is an information exchange regarding a channel condition between the BS and the UE. The BS determines the modulation and coding scheme used in transmission by logging the CQI received from the UE. If the channel condition is determined to be good by the use of the CQI, the BS may increase a data rate by increasing a modulation order or a coding rate. If the channel condition is determined to be poor by the use of the CQI, the BS can adjust the data rate by decreasing the modulation order or the coding rate.

For the periodic transmission, a CQI information amount, a modulation scheme, a channel coding scheme, etc., may be predetermined. The CQI from the UE can be overridden by the BS in order to maintain the planned MCS. Since the wireless communication system is a time variant system, the channel condition changes over time. If a CQI transmission period is significantly long or the BS overrides the CQI from the UE, the BS cannot recognize the changed channel condition. In this case, the BS cannot determine suitable changes to the MCS for the most recent channel condition. This can result in deterioration of reliability of the wireless communication system, and deterioration of overall system performance.

Thus, a need still remains for a wireless communication system with channel-quality indicator mechanism to optimize the communication performance while managing the error rate caused by environmental changes in the channel. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a wireless communication system including: a filter configured to monitor a channel-quality indicator response; and a base station behavior matrix (BBM), coupled to the filter, configured to select an ACK channel-quality indicator to be transmitted.

An embodiment of the present invention provides a wireless communication system, including: a receiver configured to receive an arriving communication including generating a channel-quality indicator response; a filter configured to monitor the channel-quality indicator response in a transmission of the arriving communication; and a base station behavior matrix (BBM), coupled to the filter, configured to select an ACK channel-quality indicator to be transmitted.

An embodiment of the present invention provides a method of operation of a wireless communication system including: calculating a baseline channel-quality indicator from the channel-quality indicator response including updating a base station behavior matrix; and transmitting an ACK channel-quality indicator, including modifying the baseline channel-quality indicator selected from the base station behavior matrix, to be transmitted.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The embodiment of the present invention provides a system and method for wireless communication system that employs an adaptive modulation and coding scheme to communicate voice, data, and control information between the base station and a mobile device. A range of modulation can be represented by a channel-quality indicator sent from the mobile device to the base station. The mobile device can characterize the response of the base station to the channel-quality indicator in order to maximize the throughput within the target block error rate (BLER).

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "channel-quality indicator" referred to herein are a system of message exchange sequences used to optimize the use of communication bandwidth. The channel-quality indicator can include for example suggested changes to the modulation and coding scheme. The term "ACK" referred to herein is an industry standard term meaning a positive acknowledgement for the receipt of a message.

Figure 1:
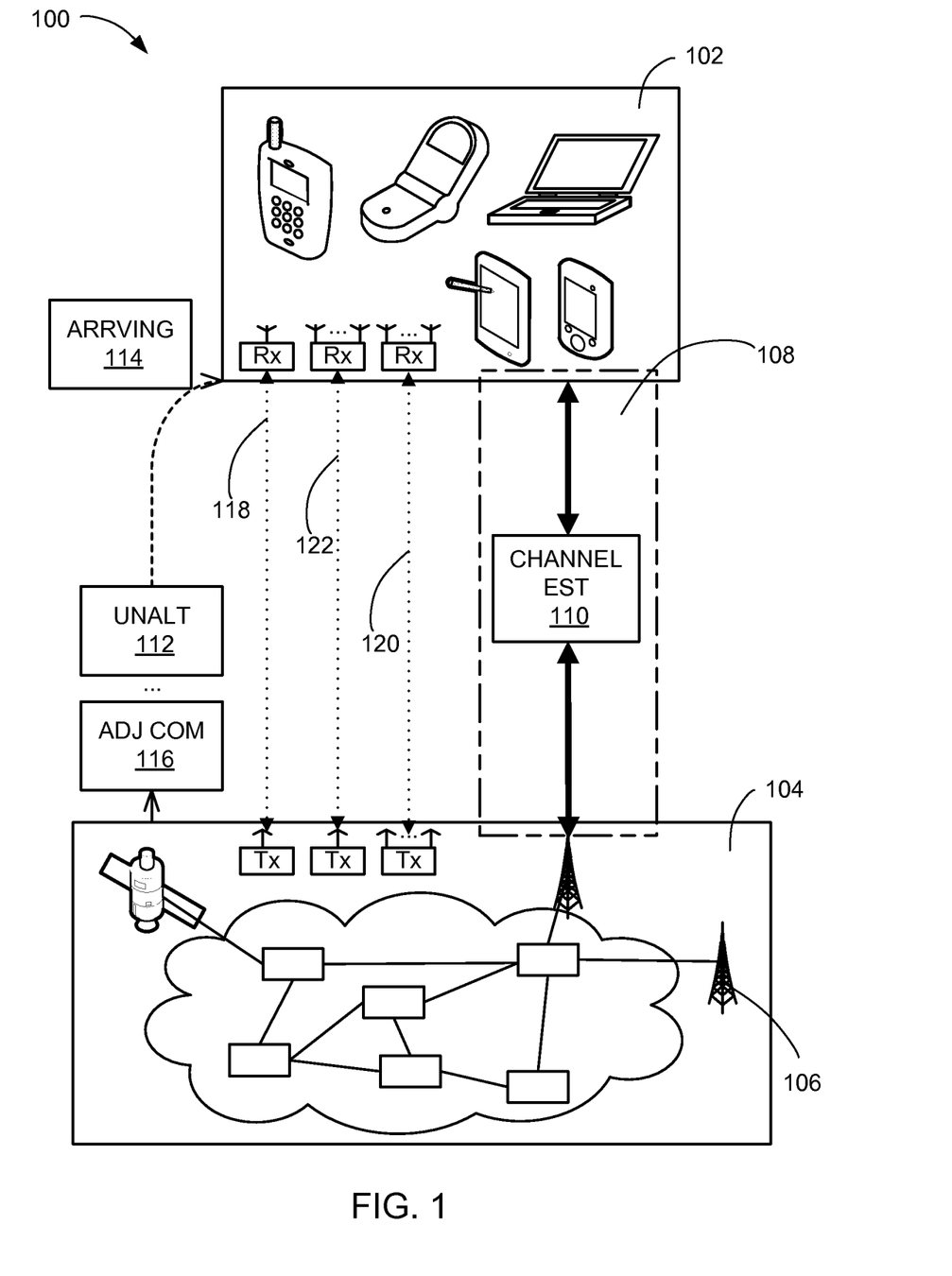
FIG. 1 is a wireless communication system with channel-quality indicator mechanism in an embodiment of the present invention.

Referring now to FIG. 1, therein is shown a wireless communication system 100 with interference cancellation mechanism in an embodiment of the present invention. The wireless communication system 100 includes a mobile device 102, such as the user equipment (UE) in the form of a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station (BS) 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof. The base station 106 can include apparatus for encoding and transmitting a wireless communication, while maintaining a maximum error rate for the transfer of information.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer. The mobile device 102 can connect to and communicate with other devices, such as other mobile devices, servers, computers, telephones, or a combination thereof.

The base station 106 can be used to wirelessly exchange signals for communication, including voice signals of a telephone call or data representing a website and interactions therewith. The base station 106 can also transmit reference signals, training signals, error detection signals, error correction signals, header information, transmission format, protocol information, or a combination thereof.

Based on the communication protocol, such as global system for mobile-communication (GSM), Enhanced Rates for GSM Evolution (EDGE), second generation (2G), third generation (3G), fourth generation (4G) standards, long term evolution (LTE) or high speed packet access (HSPA), the communication signals can include reference portions, header portions, format portions, error correction or detection portion, or a combination thereof imbedded in the communicated information. The reference portions, header portions, format portions error correction or detection portion, or a combination thereof can include a predetermined bit, pulse, wave, symbol, or a combination thereof. The various portions can be embedded within the communicated signals at regular time intervals, frequency, code, or a combination thereof.

The mobile device 102 can communicate with the base station 106 through a channel 108. The channel 108 can be wireless, wired, or a combination thereof. The channel 108 can be a direct link between the mobile device 102 and the base station 106 or can include repeaters, amplifiers, or a combination thereof. For example, the channel 108 can include communication frequency, time slot, packet designation, transmission rate, channel code, or a combination thereof used for transmitting signals between the mobile device 102 and the base station 106.

The channel 108 and the effects thereof can be represented by a channel estimate 110. The channel estimate 110 is a description of changes to signals caused by the channel 108. The channel estimate 110 can described to quantize reflection, loss, refraction, obstructions, or a combination thereof that a signal can experience while traversing between the base station 106 and the mobile device 102. The channel estimate 110 can further characterize interference that the mobile device 102 can experience from other transmitters, such as other mobile devices or other base stations, or from the movement of the mobile device 102.

For example, the base station 106 can transmit a desired input signal 112, such as the desired input to the mobile device 102. The desired input signal 112 can change while traversing through the channel 108 due to the qualities therein, such as from delayed signal reflections from various buildings, from interferences other nearby transmitting sources, from the Doppler Effect experienced when the mobile device 102 is in transit, or a combination thereof. The mobile device 102 can receive an arriving communication 114, which is the desired input signal 112 that has been changed due to qualities of the channel 108.

The mobile device 102 can determine the channel estimate 110 from the arriving communication 114. For example, the mobile device 102 can compare the information in the reference or training portion to the standardized or intended information in the reference or training portion to estimate the channel estimate 110.

The wireless communication system 100 can employ link adaptation strategies for controlling the communication between devices. Link adaptation strategy can have the mobile device 102 feedback and report information associated with the channel 108 to the base station 106. The base station 106 can use the feedback information to adjust various aspects of the communication with the mobile device 102.

The wireless communication system 100 employing link adaptation strategy can inherently have a delay between characterizing the channel 108 based on a communication, feeding information back to the base station 106, and making the adjustment based on the communication. The delay can cause the adjustments to be incorrect due to changes in the channel 108 during the delay.

For example, the mobile device 102 can characterize the channel 108 based on the arriving communication 114 corresponding to the desired input signal 112. The characterization of the channel 108 will represent the channel estimate 110 at the time of receiving the arriving communication 114. The channel 108 can change during the time necessary to determine the channel estimate 110, send feedback information to the base station 106, and have the base station 106 make adjustments accordingly. The adjustments made based on the arriving communication 114 are not relevant due to changes in the channel 108 at the time of transmitting an adjusted communication 116.

For illustrative purposes, the base station 106 will be described as transmitting signals and the mobile device 102 as receiving and replying to the transmitted signals. However, it is understood that both the mobile device 102 and the base station 106 can each transmit and receive signals.

Also for illustrative purposes, the wireless communication system 100 will be described as employing a single-input single-output (SISO) scheme 108 for communicating with one antenna on the transmitter end and one antenna on the receiver. However, it is understood that the wireless communication system 100 can employ a multiple-input multiple-output (MIMO) scheme 118 including a single-input multiple-output (SIMO) scheme 120 and a multiple-input single-output (MISO) scheme 122. The multiple-input multiple-output scheme 118 can have one or more antennas on the transmitter end, at the base station 106, communicating with one or more antennas on the receiver end, at the mobile device 102.

The multiple-input multiple-output scheme 118 can include the single-input multiple-output scheme 120 having a single antenna at the base station 106 communicating with multiple antennas on the mobile device 102. The multiple-input multiple-output scheme 118 can further include the multiple-input single-output scheme 122 having multiple antennas at the base station 106 communicating with a single antenna on the mobile device 102.

For further illustrative purposes, the mobile device 102 will be described as directly communicating with the base station 106. However, it is understood that the mobile device 102 can communicate with the base station 106 through other devices, such as a repeater, another mobile device, a router, or a combination thereof. It is also understood that the mobile device 102 can access the network 104 through devices other than the base station 106.

Figure 2:
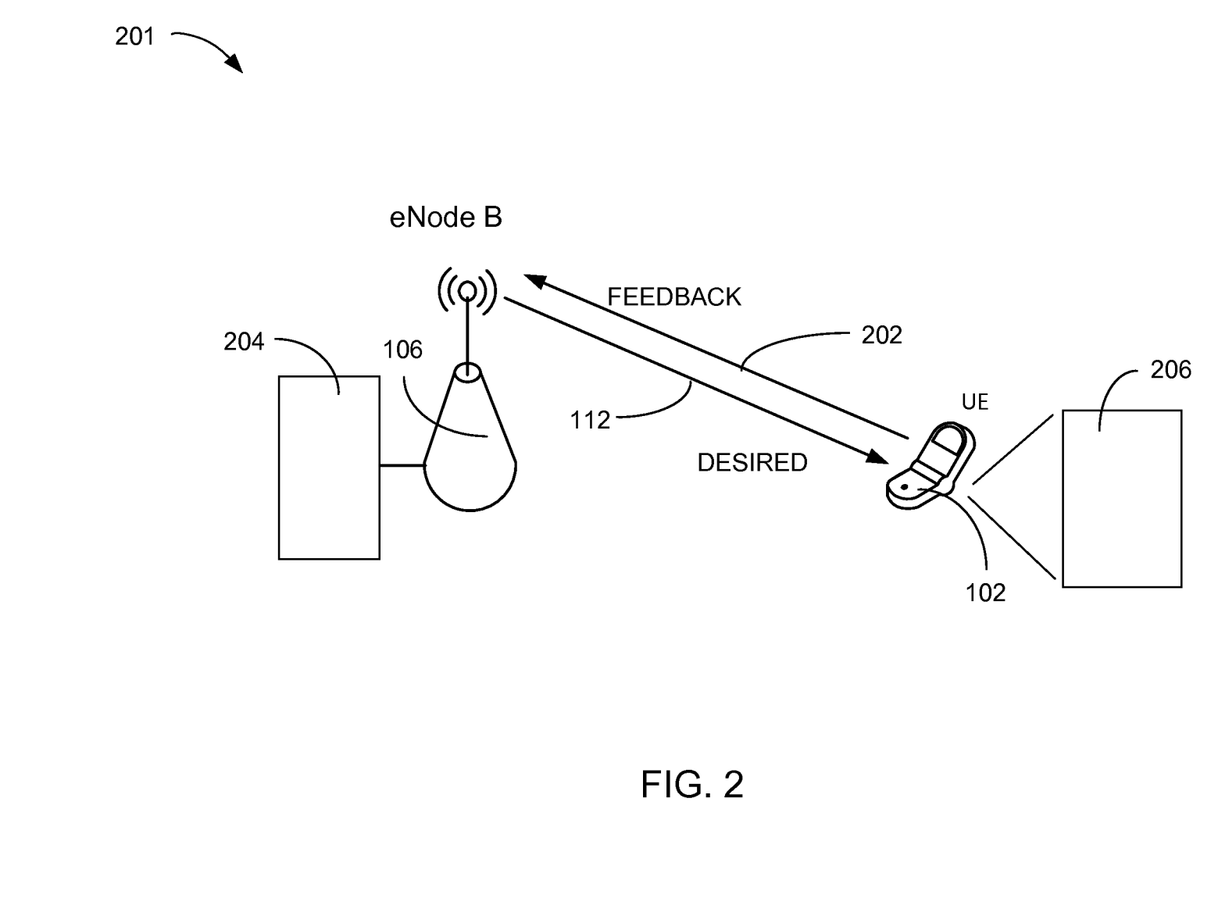
FIG. 2 is a system diagram of an application of the wireless communication system of FIG. 1.

Referring now to FIG. 2, therein is shown a system diagram of an application 201 of the wireless communication system 100 of FIG. 1. The system diagram of the application 201 depicts, as an example, the mobile device 102 receiving the desired input signal 112 from the base station 106, such as an eNode B, a wireless base station, a communication transceiver, or a wireless hot spot. The mobile device 102 is depicted as a cell phone, as an example.

The base station 106 can communicate with the mobile device 102 by adaptive modulation and coding (AMC). The base station 106 can communicate with the mobile device 102 in order to transfer the desired input signal 112 and the mobile device 102 can respond to the base station 106 through a feedback 202, such as a channel-quality indicator (CQI). The feedback 202 can be a message from the mobile device 102 to the base station 106 for the purpose of adjusting the parameters of subsequent transmissions in order to improve the throughput of those transmissions. The exchange of the feedback 202 between the mobile device 102 and the base station 106 can include the carrier level received by the UE, signal strength received, and the bit error rate. The purpose of the feedback 202 is to enable the base station 106 to adjust the modulation, coding, and signal strength of subsequent transmissions.

In field applications of the feedback 202, the base station 106 can overwrite the feedback 202 received from the mobile device 102, maintain the current settings, apply a threshold to the feedback 202 prior to making any adjustments, apply back-off algorithms in order to decrease the block error rates (BLER), or a combination thereof. The varied responses from the base station 106 can erode the performance of the mobile device 102 in an attempt to minimize the overhead of the base station 106. The base station 106 can maintain a modulation coding scheme (MCS) table 204 in order to tabulate the response to the feedback 202 of the mobile device 102.

The response by the base station 106 can be in conflict with the performance goals of the mobile device 102. In order to enhance the performance of the wireless communication between the base station 106 and the mobile device 102, it is beneficial for the mobile device 102 to characterize the response of the base station 106 to the feedback 202, which can reflect the contents of the MCS table 204 within the base station 106.

The mobile device 102 can analyze the response to the feedback 202 transmitted to the base station 106 in order to characterize the behavior of the base station 106 in responding to the mobile device 102. The behavior of the base station 106 can be characterized as the strategy used by the base station 106 in changing the coding and modulation schemes in response to the feedback 202 from the mobile device 102.

The result of the analysis can be stored in a base station behavior matrix (BBM) 206, within the mobile device 102. The content of the BBM 206, such as a probability matrix of the possible responses by the base station 106 to the feedback 202, can provide the mobile device 102 with a strategy for optimizing the throughput of the wireless communication between the base station 106 and the mobile device 102.

It has been discovered that the wireless communication system 100 can provide a channel-quality indicator mechanism for optimizing the throughput understanding the probability of a response based on the MCS table 204 within the base station 106. The mobile device 102 can communicate with the base station 106 through the feedback 202 in order to identify the optimum channel-quality indicator to transmit in order to maximize the throughput. The exchange between the desired input signal 112 and the feedback 208 provides the mobile device 102 with detailed information on the MCS table 204 required to solicit the highest bandwidth response for the base station 106. The mobile device 102 can maintain the BBM 206 in order to maximize the throughput based on the probability of soliciting a predictable response from the MCS table 204.

Figure 3:
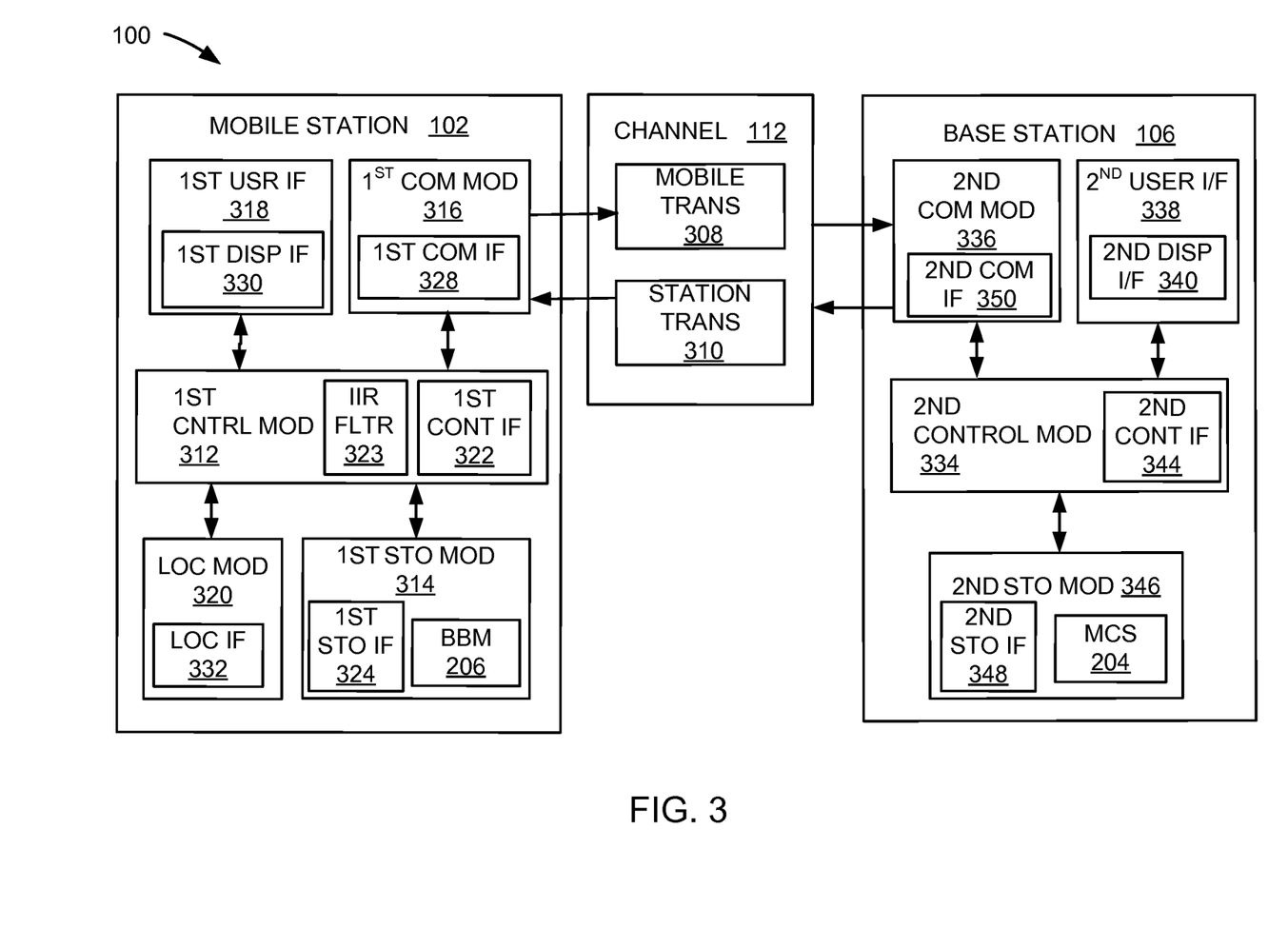
FIG. 3 is an exemplary block diagram of the wireless communication system.

Referring now to FIG. 3, therein is shown an exemplary block diagram of the communication system 100. The communication system 100 can include the mobile device 102, the network 104, and the base station 106. The mobile device 102 can send information in a mobile transmission 308 over the network 104 to the base station 106. The base station 106 can send information in a base transmission 310 over the network 104 to the mobile device 102.

For illustrative purposes, the communication system 100 is shown with the mobile device 102 as a client device, although it is understood that the communication system 100 can have the mobile device 102 as a different type of device. For example, the mobile device 102 can be a server.

Also for illustrative purposes, the communication system 100 is shown with the base station 106 as a server, although it is understood that the communication system 100 can have the base station 106 as a different type of device. For example, the base station 106 can be a client device.

For brevity of description in this embodiment of the present invention, the mobile device 102 will be described as a client device and the base station 106 will be described as a server device. The embodiment of the present invention is not limited to this selection for the type of devices. The selection is an example of the embodiment of the present invention.

The mobile device 102 can include a first control module 312, a first storage module 314, a first communication module 316, and a first user interface 318. The first control module 312 can include a first control interface 322. The first control module 312 can interrogate the base station behavior matrix (BBM) 206 to provide a maximum throughput to the communication system 100.

The first control module 312 can be implemented in a number of different manners. For example, the first control module 312 can be a processor, an application specific integrated circuit (ASIC) an embedded processor, a microprocessor, a hardware control logic, a hardware finite state machine (FSM), a digital signal processor (DSP), or a combination thereof. The first control module 312 can include a filter 323, such as an infinite impulse response (IIR) filter, for manipulating the base station behavior matrix 206. The first control interface 322 can be used for communication between the first control module 312 and other functional modules in the mobile device 102. The first control interface 322 can also be used for communication that is external to the mobile device 102.

The first control interface 322 can receive information from the other functional modules or from external sources, or can transmit information to the other functional modules or to external destinations. The external sources and the external destinations refer to sources and destinations external to the mobile device 102.

The first control interface 322 can be implemented in different ways and can include different implementations depending on which functional modules or external modules are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof. The filter 323 can be a digital infinite impulse response (IIR) filter or an analog IIR filter for manipulating the BBM 206. The first control module 312 can manipulate interface registers (not shown) for the filter 323.

The first storage module 314 can store the base station behavior matrix (BBM) 206. The first storage module 314 can also store the relevant information, such as data representing incoming messages, data representing the block error rate, message statistics, the feedback 202 of FIG. 2, sound files, or a combination thereof.

The first storage module 314 can be a volatile memory, a nonvolatile memory, an internal memory, an external memory, or a combination thereof. For example, the first storage module 314 can be a nonvolatile storage such as non-volatile random access memory (NVRAM), Flash memory, disk storage, or a volatile storage such as static random access memory (SRAM).

The first storage module 314 can include a first storage interface 324. The first storage interface 324 can be used for communication between and other functional modules in the mobile device 102. The first storage interface 324 can also be used for communication that is external to the mobile device 102.

The first storage interface 324 can receive information from the other functional modules or from external sources, or can transmit information to the other functional modules or to external destinations. The external sources and the external destinations refer to sources and destinations external to the mobile device 102.

The first storage interface 324 can include different implementations depending on which functional modules or external modules are being interfaced with the first storage module 314. The first storage interface 324 can be implemented with technologies and techniques similar to the implementation of the first control interface 322.

The first communication module 316 can enable external communication to and from the mobile device 102. For example, the first communication module 316 can permit the mobile device 102 to communicate with the base station 106 of FIG. 1, an attachment, such as a peripheral device or a computer desktop, and the network 104.

The first communication module 316 can also function as a communication hub allowing the mobile device 102 to function as part of the network 104 and not limited to be an end point or terminal module to the network 104. The first communication module 316 can include active and passive components, such as microelectronics or an antenna, for interaction with the network 104.

The first communication module 316 can include a first communication interface 328. The first communication interface 328 can be used for communication between the first communication module 316 and other functional modules in the mobile device 102. The first communication interface 328 can receive information from the other functional modules or can transmit information to the other functional modules.

The first communication interface 328 can include different implementations depending on which functional modules are being interfaced with the first communication module 316. The first communication interface 328 can be implemented with technologies and techniques similar to the implementation of the first control interface 322.

The first user interface 318 allows a user (not shown) to interface and interact with the mobile device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control module 312 can operate the first user interface 318 to display information generated by the wireless communication system 100. The first control module 312 can also manipulate the BBM 206 through the filter 323 for the other functions of the wireless communication system 100. The first control module 312 can further analyze the BBM 206 in order to optimize the throughput from the network 104 via the first communication module 316.

The base station 106 can be optimized for implementing the embodiment of the present invention in a multiple device embodiment with the mobile device 102. The base station 106 can provide the additional or higher performance processing power compared to the mobile device 102. The base station 106 can include a second control module 334, a second communication module 336, and a second user interface 338.

The second user interface 338 allows a user (not shown) to interface and interact with the base station 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control module 334 can execute a second software 342 to provide the intelligence of the base station 106 of the communication system 100. The second software 342 can operate in conjunction with the first software 326. The second control module 334 can provide additional performance compared to the first control module 312.

The second control module 334 can operate the second user interface 338 to display information. The second control module 334 can also maintain the modulation and coding scheme table (MCS) 204 for the other functions of the wireless communication system 100, including operating the second communication module 336 to communicate with the mobile device 102 over the network 104.

The second control module 334 can be implemented in a number of different manners. For example, the second control module 334 can be a processor, an embedded processor, a microprocessor, hardware control logic, a hardware finite state machine (FSM), a digital signal processor (DSP), or a combination thereof.

The second control module 334 can include a second controller interface 344. The second controller interface 344 can be used for communication between the second control module 334 and other functional modules in the base station 106. The second controller interface 344 can also be used for communication that is external to the base station 106.

The second controller interface 344 can receive information from the other functional modules or from external sources, or can transmit information to the other functional modules or to external destinations. The external sources and the external destinations refer to sources and destinations external to the base station 106.

The second controller interface 344 can be implemented in different ways and can include different implementations depending on which functional modules or external modules are being interfaced with the second controller interface 344. For example, the second controller interface 344 can be implemented to include a pressure sensor, an inertial sensor, a microelectromechanical system (MEMS), optical circuitry, waveguides, wireless circuitry, wireline circuitry, or a combination thereof.

A second storage module 346 can store the second software 342. The second storage module 346 can also store the data representing incoming messages, data representing block error rate targets, sound files, or a combination thereof. The second storage module 346 can be sized to provide the additional storage capacity to supplement the first storage module 314.

For illustrative purposes, the second storage module 346 is shown as a single element, although it is understood that the second storage module 346 can be a distribution of storage elements. Also for illustrative purposes, the communication system 100 is shown with the second storage module 346 as a single hierarchy storage system, although it is understood that the communication system 100 can have the second storage module 346 in a different configuration. For example, the second storage module 346 can be formed with different storage technologies forming a memory hierarchal system including different levels of caching, main memory, rotating media, or off-line storage.

The second storage module 346 can be a volatile memory, a nonvolatile memory, an internal memory, an external memory, or a combination thereof. For example, the second storage module 346 can be a nonvolatile storage such as non-volatile random access memory (NVRAM), Flash memory, disk storage, or a volatile storage such as static random access memory (SRAM).

The second storage module 346 can include a second storage interface 348. The second storage interface 348 can be used for communication between other functional modules in the base station 106. The second storage interface 348 can also be used for communication that is external to the base station 106.

The second storage interface 348 can receive information from the other functional modules or from external sources, or can transmit information to the other functional modules or to external destinations. The external sources and the external destinations refer to sources and destinations external to the base station 106.

The second storage interface 348 can include different implementations depending on which functional modules or external modules are being interfaced with the second storage module 346. The second storage interface 348 can be implemented with technologies and techniques similar to the implementation of the second controller interface 344.

The second communication module 336 can enable external communication to and from the base station 106. For example, the second communication module 336 can permit the base station 106 to communicate with the mobile device 102 over the network 104.

The second communication module 336 can also function as a communication hub allowing the base station 106 to function as part of the network 104 and not limited to be an end point or terminal module to the network 104. The second communication module 336 can include active and passive components, such as microelectronics or an antenna, for interaction with the network 104.

The second communication module 336 can include a second communication interface 350. The second communication interface 350 can be used for communication between the second communication module 336 and other functional modules in the base station 106. The second communication interface 350 can receive information from the other functional modules or can transmit information to the other functional modules.

The second communication interface 350 can include different implementations depending on which functional modules are being interfaced with the second communication module 336. The second communication interface 350 can be implemented with technologies and techniques similar to the implementation of the second controller interface 344.

The first communication module 316 can couple with the network 104 to send information to the base station 106 in the mobile transmission 308. The base station 106 can receive information in the second communication module 336 from the mobile transmission 308 of the network 104.

The second communication module 336 can couple with the network 104 to send information to the mobile device 102 in the base transmission 310. The mobile device 102 can receive information in the first communication module 316 from the base transmission 310 of the network 104. The wireless communication system 100 can be executed by the first control module 312, the second control module 334, or a combination thereof. For illustrative purposes, the base station 106 is shown with the partition having the second user interface 338, the second storage module 346, the second control module 334, and the second communication module 336, although it is understood that the base station 106 can have a different partition. For example, the second software 342 can be partitioned differently such that some or all of its function can be in the second control module 334 and the second communication module 336. Also, the base station 106 can include other functional modules not shown in FIG. 3 for clarity.

The functional modules in the mobile device 102 can work individually and independently of the other functional modules. The mobile device 102 can work individually and independently from the base station 106 and the network 104.

The functional modules in the base station 106 can work individually and independently of the other functional modules. The base station 106 can work individually and independently from the mobile device 102 and the network 104.

For illustrative purposes, the communication system 100 is described by operation of the mobile device 102 and the base station 106. It is understood that the mobile device 102 and the base station 106 can operate any of the modules and functions of the communication system 100.

The modules described in this application can be hardware implementation or hardware accelerators in the first control module 312 or in the second control module 334. The modules can also be hardware implementation or hardware accelerators within the first device 102 or the second device 106 but outside of the first control module 312 or the second control module 334, respectively.

Figure 4:
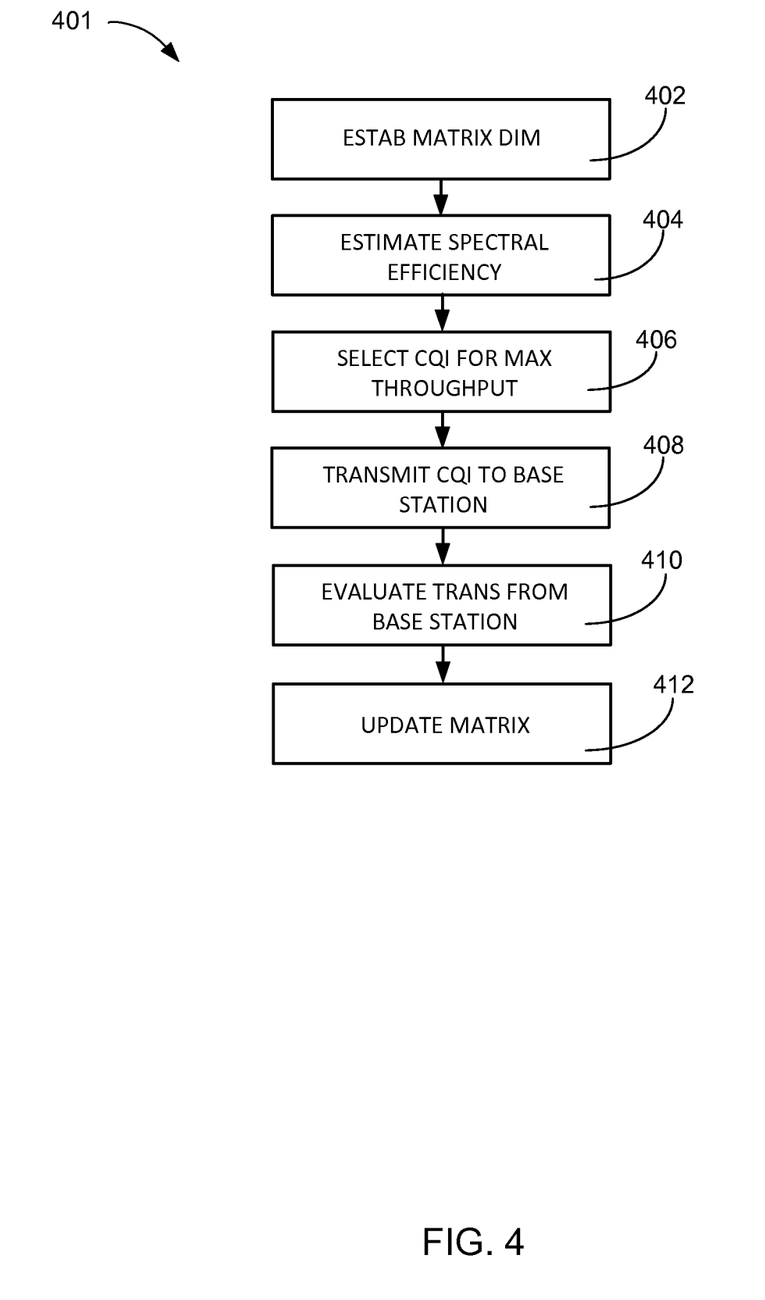
FIG. 4 is a flow chart of a channel-quality indicator selection process for a base station behavior matrix.

Referring now to FIG. 4, therein is shown a flow chart of a channel-quality indicator selection process 401 for the base station behavior matrix (BBM) 206 of FIG. 2. The flow chart of the channel-quality indicator selection process 401 depicts an initialization module 402 for establishing a dimension of the BBM 206 of FIG. 2. Taking LTE as an example, since there are 15 CQIs, the BBM 206 will be a 15×15 matrix. Row i represents $CQI_i$, sent by the mobile device 102 of FIG. 1. Column j represents $CQI_j$ assigned by the base station 106 of FIG. 1 to the mobile device 102. Each element of the matrix, $P_{ij}$, stands for a probability that the base station 106 will assign $CQI_j$ to the mobile device 102 when the mobile device 102 sends a request for $CQI_i$.

The initialization of the BBM 206 can be performed by $P_{ij}=1$ when i=j and $P_{ij}=0$ when i is not equal to j. The initialization assumes that the base station 106 will respond to the mobile device 102 with the same modulation and coding requested in the channel-quality indicator.

At the downlink of both the LTE and the HSDPA systems, the base station 106 can allocate packet transmission based on feedback 202 of FIG. 2 from the mobile device 102. The base station 106 does not always honor the feedback 202 from the mobile device 102. As an example, if the mobile device 102 requests $CQI_5$ through the feedback 202, the base station 106 does not always assign an equivalent to $CQI_5$, from the MCS table 204 of FIG. 2, for transmission. The wireless communication system 100 of FIG. 1 is a master-slave system having the base station 106 as the master and the mobile device 102 as the slave. If the mobile device 102 tries to optimize the throughput without regard to the response of the base station 106, the mobile device 102 can eventually be subject to lower throughput because of the management scheme applied by the base station 106.

On the other hand, if the mobile device 102 can monitor the behavior of the base station 106, a strategy can be formulated to exploit the behavior and achieve the goal of maximizing throughput. The BBM 206 is an effective way for the mobile device 102 to monitor the behavior of the base station 106 in order to maximize throughput without being subject to restrictions in the MCS table 204 of the base station 106.

The flow then proceeds to an estimate spectral efficiency module 404. The estimate spectral efficiency module 404 can determine a signal to interference and noise ratio (SINR) for each subframe in a message. An expected spectral efficiency for each of the modulation and code rate in LTE or HSDPA can be found in a table within the LTE and HSDPA standards. The estimate spectral efficiency module 404 can apply the expected spectral efficiency to the BBM 206 in order to determine what the highest probability value reflecting an entry in the BBM 206 should be returned as the feedback 202.

By way of an example, there can be a system that supports only three CQI responses for the feedback 202: $CQI_1$, $CQI_2$, $CQI_3$. The SINR thresholds for the three CQIs can be 1 dB, 2 dB, 3 dB, respectively, and their spectral efficiencies are 0.1523, 0.2344, 0.3770, (from LTE CQI table). In the example, the measured SINR can be 2.5 dB, if the base station 106 transmits with $CQI_1$ under this channel condition, the results should be a positive acceptance of the received data known as ACK. With the expected spectral efficiency for $CQI_1$ is $E_1=0.1523*1=0.1523$. For $CQI_2$, the results should be a positive acceptance of the received data (ACK) because $E_2=0.2344$ and the threshold for $CQI_2$ is 2 dB. But for $CQI_3$, the first transmission is likely to result in a negative acceptance of the received data, known as NACK, and the data can only be positively accepted with a retry of the transmission. The probability must be adjusted to reflect the retry, $E_3=0.3770/2=0.1885$, because the 3 dB of $CQI_3$ exceeds the measured SINR. Therefore, given the measured SINR of 2.5 dB, the expected spectral efficiency for three CQIs is $[E_1, E_2, E_3]=[0.1523, 0.2344, 0.1885]$. By this example the mobile device 102 would respond with the feedback 202 that indicates $CQI_2$ for the optimum throughput.

It is understood that the previous description was given as an example of how to calculate spectral efficiency based on SINR measurement. Other strategies of calculating the BBM 206 can work with any approach that accurately estimates the expected spectral efficiency for various channel profiles and speeds.

The flow then proceeds to a select channel-quality indicator module 406. The select channel-quality indicator module 406 can search the BBM 206 for the CQI entry that represents the maximum throughput by:

$$\underset{i}{\operatorname{argmax}}\left(\sum_{j=1}^{15} Pij \times Ej\right) \qquad \text{(Equation 1)}$$

The selection of the appropriate value of the CQI entry provides the highest probability of achieving the maximum throughput for the mobile device 102. The refinement of the distribution of the probabilities in the BBM 206 increases the likelihood of achieving the desired throughput from the base station 106.

The flow then proceeds to a transmit to base station module 408. The transmit to base station module 408 can allow the mobile device 102 to transfer the selected CQI, as the feedback 202, to the base station 106.

The base station 106 can take one of several actions in response to the feedback 202. The base station 106 can transmit data packets with the same modulation and coding that is requested by the feedback 202, ignore the feedback 202 and continue to transfer the modulation and coding that it had previously transferred, or take on a conservative transfer scheme by using a back-off algorithm to reduce the throughput in favor of a better block error rate (BLER). The base station 106 can determine the CQI assigned by the base station 106 can be calculated based on the modulation and coding scheme (MCS) table 204, a Control Format Indicator (CFI) and other factors.

When the base station 106 responds to the mobile device 102, the flow proceeds to an evaluate transfer module 410. The evaluate transfer module 410 can receive a transmitted subframe, evaluate the signal to interference and noise ratio (SINR), and determine which of the channel-quality indicators the base station 106 used for the transmitted subframe. The mobile device 102 can assume a delay, on the part of the base station 106, to changes in the feedback 202. For LTE, the mobile device can assume the delay is equal to eight subframes of the transmitted data.

It is understood that the delay by the base station 106 can be a different delay than the eight subframes. Once the base station 106 demonstrates an actual delay for the response to the change of CQI in the feedback 202, the actual delay will be used for the analysis.

The flow then proceeds to an update matrix module 412 in order to analyze the changes of the BBM 206 based on the response from the base station 106. The mobile device 102 can use the filter 323 of FIG. 3 for analyzing the impact to the BBM 206.

When a new packet is transferred from the base station 106 to the mobile device 102, the base station 106 can use a CQI=n for coding the data within the new packet. Based on the delay, the mobile device 102 can identify its own CQI=m that caused the base station 106 to transfer the new packet.

The mobile device 102 can update the BBM 206 at row m with:

$$P_{mn}=(1-\alpha)P_{mn}+\alpha \qquad \text{(Equation 2)}$$

where α is a constant much smaller than 1. The other entries in row m can be updated by:

$$P_{mj}=(1-\alpha)P_{mj}, j \neq n \qquad \text{(Equation 3)}$$

where j represents the columns other than n. This update assures that the sum of all the probabilities in row m will be equal to 1. For other rows of the BBM 206, for row k≠m the probability can be adjusted by:

$$P_{kk}=(1-\beta)P_{kk}+\beta \qquad \text{(Equation 4)}$$

where β is smaller than α. The other columns having a j not equal to k can ber represented by:

$$P_{kj}=(1-\beta)P_{kj}, j \neq k \qquad \text{(Equation 5)}$$

If no new data packet arrives by the delay, the BBM 206 can be updated by using equation (4) and equation (5) as shown above. When the values of α>>β are used, the BBM 206 can quickly model the current behavior of the base station 106. If no new data is transferred, the BBM 206 can slowly return to its initial state where $P_{ij}=1$ when i=j and $P_{ij}=0$ when i is not equal to j.

It has been discovered that the embodiment of the wireless communication system 100 of FIG. 1 can provide an increase in throughput of data exchanged between the mobile device 102 and the base station 106. The maintenance of the BBM 206 can allow the mobile device to actively track and adjust to the changing conditions of the base station 106. The use of the filter 323 to track and adjust the BBM 206 can provide significant performance gains for over-conservative or over-aggressive instances of the base station 106.

Figure 5:
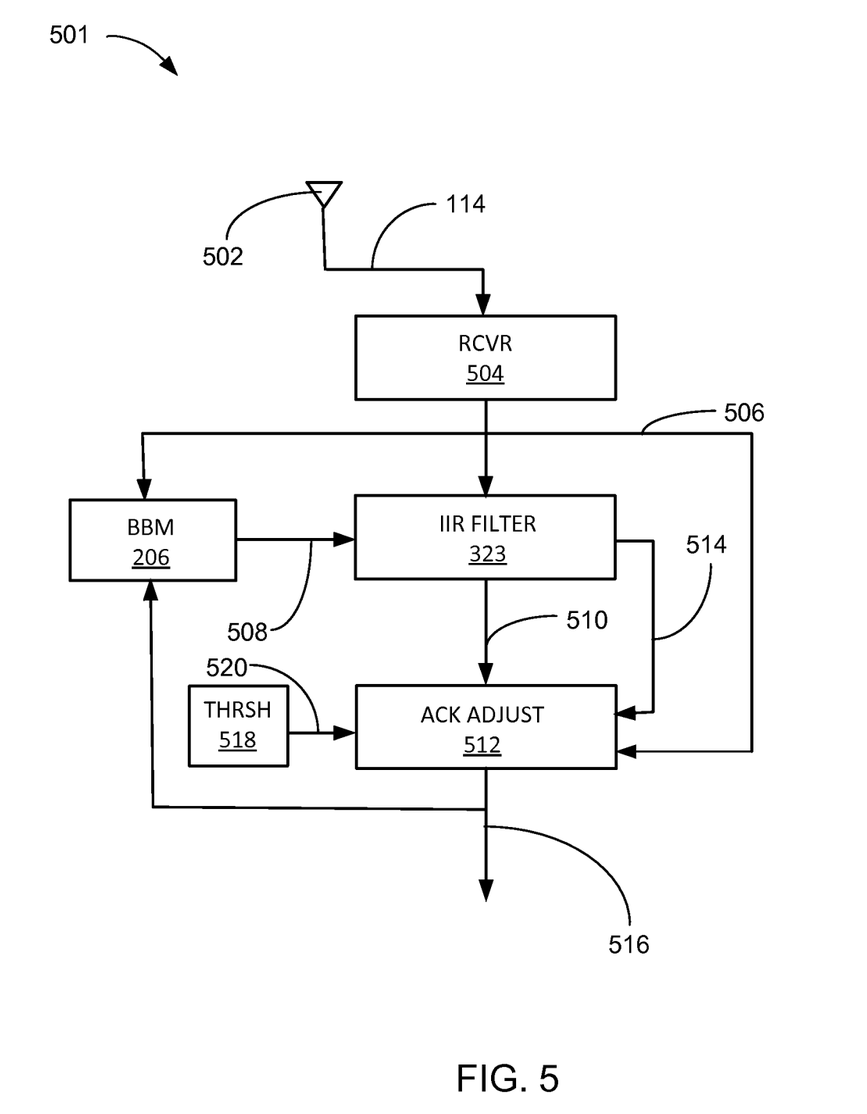
FIG. 5 is a functional block diagram of a throughput optimization circuit of the wireless communication system.

Referring now to FIG. 5, therein is shown a functional block diagram of a throughput optimization circuit 501 of the wireless communication system 100. The functional block diagram of the throughput optimization circuit 501 depicts an antenna 502, such as a single antenna or a multiple antenna, coupled to a receiver 504. The receiver 504 can accept the arriving communication 114 from the antenna 502 to decode the desired input signal 112 of FIG. 1. The receiver 504 can also provide a CQI response 506, which reflects the response from the base station 106 to the previous ACK from the mobile device 102 of FIG. 1.

The CQI response 506 can be coupled between the receiver 504, the base station behavior matrix (BBM) 206, the filter 323, and an ACK adjustment module 512. The filter 323 can accept the CQI response 506 and a requested CQI 508 in order to calculate a CQI offset 510. The CQI offset 510 can be calculated by:

$$C[n]=(1-\alpha)C[n-1]+\alpha(B[n]-A[n]) \qquad \text{(Equation 6)}$$

where C[n] is the CQI offset 510, A[n] is the CQI response 506, B[n] is the requested CQI 508, n is a current sample, n−1 is a previous sample, and α is a constant much smaller than 1.

The CQI offset 510 can be coupled to the ACK adjustment module 512. The ACK adjustment module 512 can be configured to add the CQI offset 510 to a baseline CQI 514 received from the filter 323. The baseline CQI 514 can be calculated by:

$$B'[n]=B[n-1](1-W)+1000W \qquad \text{(Equation 7)}$$

where B'[n] is the baseline CQI 514, B [n−1] is the requested CQI 508, and W is a constant of value 1/32.

The ACK adjustment module 512 provide an ACK CQI 516 that can be calculated by:

$$CQI[n]=B'[n]+C[n] \qquad \text{(Equation 8)}$$

where CQI[n] is the value sent from the mobile device 102 to the base station 106 in the ACK response.

The ACK CQI 516 can be coupled to the BBM 206 for updating the requested CQI 508.

The ACK adjustment module 512 can also be configured to apply a threshold register 518 to the CQI offset 510 prior to making any changes to the baseline CQI 514. The threshold register 518 can be loaded by the first control module 312 of FIG. 3 that can restrict when CQI offset 510 can be updated. The threshold register 518 can provide a threshold value 520, such as an analog voltage or a digital sequence of values, which is utilized by the ACK adjustment module 512 to control updates of the CQI offset 510. The ACK adjustment module 512 can execute a calculation to determine if the CQI offset 510 should be used or not. The CQI offset 510 determination can be performed by:

$$|A[n]-B[n]|<T \quad \text{(Equation 9)}$$

where T represents the threshold value 520, A[n] is the CQI response 506, and B[n] is the requested CQI 508 which can be passed through the baseline CQI 514 for the calculation. If the equation (9) is satisfied, the CQI offset 510 is calculated by the equation (6) as shown above.

It is understood that the ACK adjustment module 512 can be configured by the first control module 312 in order to support three distinct modes of operation represented by the BBM 206 as loaded by the filter 323, applying the CQI offset 510 all of the time, or applying the CQI offset 510 only if the threshold is met. It is further understood that each of the operating modes of the throughput optimization circuit 501 are dependent on the behavior of the base station 106.

It has been discovered that the embodiment of the wireless communication system 100 can optimize the throughput of the transfers between the mobile device 102 and the base station 106 by monitoring the behavior of the base station 106 through the base station behavior matrix (BBM) 206. The wireless communication system 100 can dynamically adapt the processing of the arriving communication 114 based on the behavior of the base station 106 by tracking the behavior of the base station 106, applying the CQI offset 510, or applying the CQI offset 510 within the threshold value 520 in order to optimize the performance and throughput of the mobile device 102.

| Modulation | Rate |
|---|---|
| QPSK | 0.1523 |
| QPSK | 0.2344 |
| QPSK | 0.3770 |
| QPSK | 0.6016 |
| QPSK | 0.8770 |
| QPSK | 1.1758 |
| 16QAM | 1.4766 |
| 16QAM | 1.9141 |
| 16QAM | 2.4063 |
| 64QAM | 2.7305 |
| 64QAM | 3.3223 |
| 64QAM | 3.9023 |
| 64QAM | 4.5234 |
| 64QAM | 5.1152 |
| 64QAM | 5.5547 |

Table 1 of expected spectral efficiency for LTE symbol rates

It is understood that the BBM 206 can be implemented as a memory device supported by a processor or combinational logic. The filter 323 can be implemented by digital logic, analog circuitry, or a combination thereof.

Figure 6:
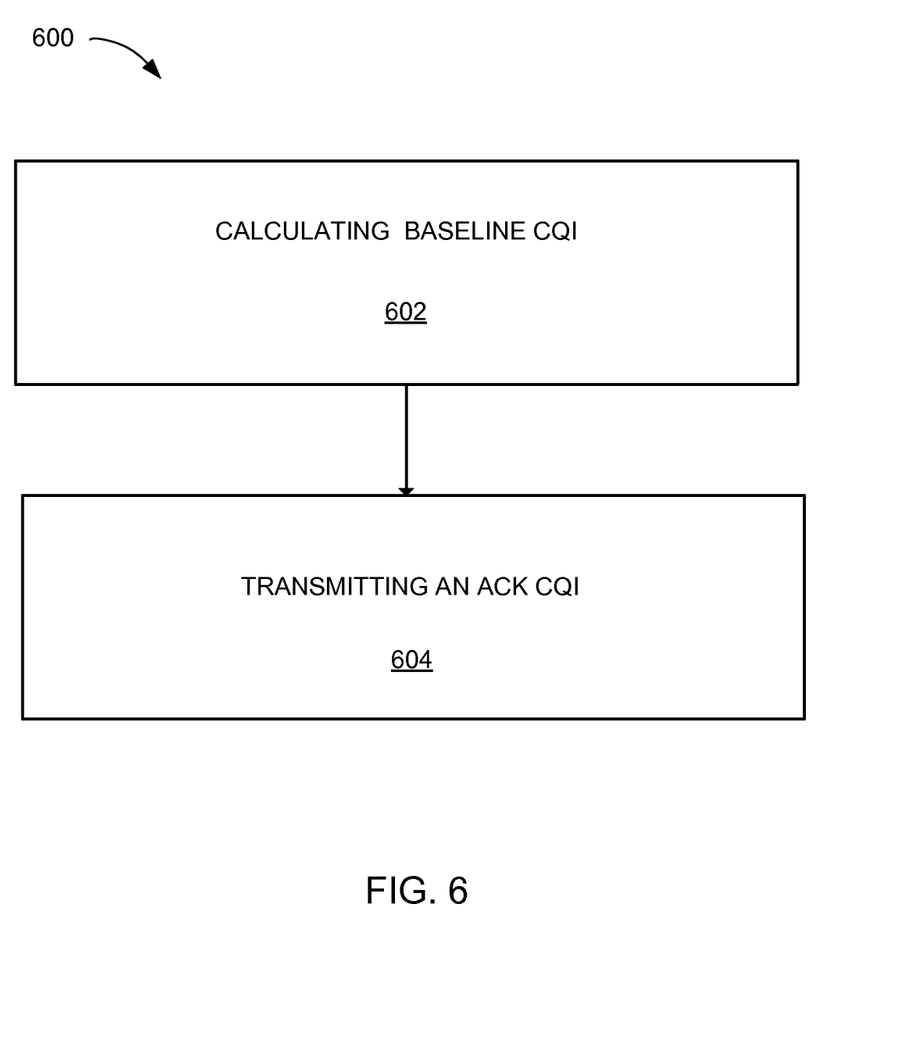
FIG. 6 a flow chart of a method of operation of a wireless communication system in an embodiment of the present invention.

Referring now to FIG. 6, therein is shown a flow chart of a method 600 of operation of a wireless communication system 100 in an embodiment of the present invention. The method 600 includes: calculating a baseline channel-quality indicator from the channel-quality indicator response including updating a base station behavior matrix in a block 602; and transmitting an ACK channel-quality indicator, including modifying the baseline channel-quality indicator selected from the base station behavior matrix, to be transmitted in a block 604.

The embodiment of the present invention provides that the wireless communication system 100 can optimize the throughput of the transfers between the mobile device 102 and the base station 106 by monitoring the behavior of the base station 106 through the base station behavior matrix (BBM) 206. The wireless communication system 100 can dynamically adapt the processing of the arriving communication 114 based on the behavior of the base station 106 by tracking the behavior of the base station 106, applying the CQI offset 510, or applying the CQI offset 510 within the threshold value 520 in order to optimize the performance and throughput of the mobile device 102.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A wireless communication system comprising:
a control module including circuitry configured to:
monitor a channel-quality indicator response;
generate a base station behavior matrix for selecting an ACK channel-quality indicator to be transmitted, the base station behavior matrix for representing a probability matrix including a set of probabilities corresponding to possible behaviors of a base station responding to possible instances of the ACK channel-quality indicator; and
a memory, coupled to the control module, configured to store the base station behavior matrix.

2. The system as claimed in claim 1 wherein the control module is configured to calculate the ACK channel-quality indicator.

3. The system as claimed in claim 1 wherein the control module includes an infinite impulse response filter.

4. The system as claimed in claim 1 further comprising a receiver, coupled to the control module, configured to identify the channel-quality indicator response.

5. The system as claimed in claim 1 wherein the control module is configured to manage the base station behavior matrix.

6. The system as claimed in claim 1 further comprising a receiver configured to receive an arriving communication including generating a channel-quality indicator response.

7. The system as claimed in claim 1 wherein the control module is configured to calculate the ACK channel-quality indicator based on a channel-quality indicator offset.

8. The system as claimed in claim 1 wherein the control module includes an infinite impulse response filter configured to calculate a channel-quality indicator offset and a baseline channel-quality indicator.

9. The system as claimed in claim 1 wherein the control module is configured to identify the channel-quality indicator response based on a behavior of a monitored instance of the base station.

10. The system as claimed in claim 1 wherein the control module is configured to select an ACK channel-quality indicator from the memory to optimize the performance of a mobile device.

11. The system as claimed in claim 1 further comprising a receiver, coupled to the control module, configured to receive an arriving communication and generate a channel-quality indicator response.

12. The system as claimed in claim 1 wherein the control module is configured to calculate the ACK channel-quality indicator based on a channel-quality indicator offset from a filter within the control module.

13. The system as claimed in claim 1 wherein the control module includes an infinite impulse response filter configured to calculate a channel-quality indicator offset and a baseline channel-quality indicator.

14. The system as claimed in claim 1 wherein the control module is configured to monitor a behavior of the channel-quality indicator response.

15. The system as claimed in claim 1 wherein the control module is configured to select an ACK channel-quality indicator based on an entry of the base station behavior matrix optimizing a performance for representing a mobile device.

16. A method of operation of a wireless communication system comprising:

calculating with a control module including circuitry a baseline channel-quality indicator based on a base station behavior matrix for representing a probability matrix including a set of probabilities corresponding to possible behaviors of a base station responding to possible instances of the ACK channel-quality indicator; and transmitting an ACK channel-quality indicator, including modifying the baseline channel-quality indicator selected from the base station behavior matrix, to be transmitted.

17. The method as claimed in claim 16 further comprising modifying, by an ACK adjust module, the baseline channel-quality indicator to calculate the ACK channel-quality indicator.

18. The method as claimed in claim 16 wherein filtering the channel-quality indicator response including invoking an infinite impulse response filter.

19. The method as claimed in claim 16 further comprising receiving an arriving communication from the base station configured to identify a channel-quality indicator response.

20. The method as claimed in claim 16 wherein updating the base station behavior matrix includes storing the ACK channel-quality indicator by a control module.

* * * * *